J. T. SZEK.
GALVANIC CELL.
APPLICATION FILED SEPT. 23, 1907.
905,952.  Patented Dec. 8, 1908.
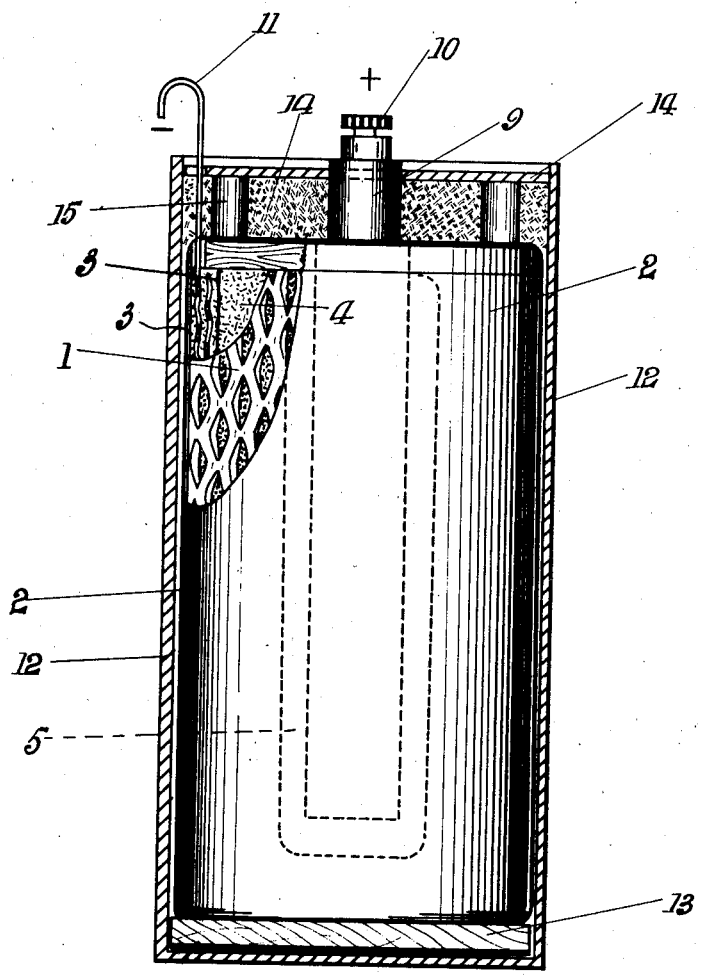

UNITED STATES PATENT OFFICE.

JOSEPH THEODOR SZEK, OF LONDON, ENGLAND.

GALVANIC CELL.

No. 905,952.      Specification of Letters Patent.      Patented Dec. 8, 1908.

Application filed September 23, 1907. Serial No. 394,246.

*To all whom it may concern:*

Be it known that I, JOSEPH THEODOR SZEK, electrical engineer, residing at 53/4 Chancery Lane, London, W. C., England, have invented certain new and useful Improvements in Galvanic Cells; and I do hereby declare the following to be a full, clear, and exact description of the invention, such as will enable others skilled in the art to which it appertains to make and use the same.

This invention relates to an improved construction of a galvanic cell in which the destructible negative-pole electrode consists of any suitable metal, such as zinc, magnesium or alloys of such and is so constructed as to increase the surface of action. When making the negative electrode or element in such cells, dry or wet, of perforated sheets uncombined or combined with a solid sheet, it is possible under special circumstances to create a somewhat increased active surface, with given weight and thickness of sheets without however affording the desired conditions for the uniform attack and circulation of the electrolyte around such element. A far more satisfactory exposure and utilization of the negative element is however possible when, in carrying out this invention, so called expanded metal instead of perforated metal is employed.

As is well known, expanded metal is produced by slotting a solid sheet which is then expanded or stretched transversely, whereupon the slots are enlarged in the form of gaping (honey comb like) openings and the strips between the slots assume a peculiar twisted shape. The term "expanded metal" as herein employed is limited to metal structures of the type above described and this material is both economical in manufacture because the waste which results from the manufacture of perforated sheets is obviated, and it is especially suitable for affording a comparatively large exposed surface in contact with the electrolyte.

To further illustrate my improvements reference is made to the accompanying drawing in which I have shown a sectional elevation of my invention.

For the purpose of forming an electrode or element, the sheet of expanded metal 1, may be combined with one or several layers of solid metal or with layers of perforated metal 2.

In the application of the invention especially for dry cells, it has proved advantageous to cover the electrode consisting of one or several sheets of expanded metal and otherwise in the form of an ordinary zinc cylinder (or plate) inside and outside with a loose wove of hemp, jute, canvas or the like 3, which is saturated or well covered with the electrolyte and in some instances impregnated to make it resisting to acids. Suitable electrolytes or impregnating substances may be adopted for this purpose and it has been found practicable to prepare the electrolyte, such as sal-ammoniac, in the form of a jelly like mass 4, with rice for example and to apply it to the said wove or fabric before being employed as a cover on and around the negative electrode. The fabric keeps the electrolyte mass porous and permanently uniformly distributed over the entire surface of the metal whereby a uniform chemical action is attained in the cell. The expanded metal as compared with perforated sheets enables a much more economical utilization, because a smaller weight proportion affords a larger surface and is covered on both sides by the electrolyte thereby attaining a better action. In cases where a solid sheet or cylinder is fitted behind the expanded metal, a still more active and larger electrode surface is produced.

It has been found that cells of the described construction have a high capacity and a comparatively long life affording also the possibility of recharging several times. This is due to the fact that the metal is dissolved homogeneously during the delivery of current and kept ready in the neighborhood of the electrode for the purpose of being redeposited thereon.

The cell shown in the drawing as a complete galvanic element has the usual depolarizing bag 5, containing the positive carbon electrode 9, with suitable terminals 10 and 11, on positive and negative poles respectively. The whole I inclose in a papier mâché case or cover 12, and insulate the bottom of the cell by standing same on a paraffin dipped plaque 13. The cell is capped with the usual material such as pitch 14, or sawdust capped with pitch; and vents 15, in said capping allow the gases to escape.

I claim:—

1. A battery of the character described comprising an expanded sheet metal electrode.

2. A battery of the character described, comprising an outer metal casing and a layer of expanded sheet metal disposed adjacent thereto and in electrical communication therewith, said casing and expanded metal comprising one electrode of said battery, substantially as described.

In testimony whereof I affix my signature, in presence of two witnesses.

JOSEPH THEODOR SZEK.

Witnesses:
N. R. JAURALDE,
F. W. SMITH.